(12) United States Patent
Noguchi

(10) Patent No.: US 6,404,568 B2
(45) Date of Patent: Jun. 11, 2002

(54) LENS BARREL

(75) Inventor: Yukio Noguchi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/818,496

(22) Filed: Mar. 28, 2001

(30) Foreign Application Priority Data

Mar. 31, 2000 (JP) ........................................ 2000-098965

(51) Int. Cl.[7] ............................. G02B 7/02; G02B 15/14
(52) U.S. Cl. ....................................... 359/823; 826/696
(58) Field of Search ............................. 359/822, 823, 359/824, 826, 694, 696, 697, 698, 704, 706; 396/75, 85, 348, 349

(56) References Cited

U.S. PATENT DOCUMENTS

| | | | |
|---|---|---|---|
| 4,990,945 A | | 2/1991 | Cho et al. ................... 396/84 |
| 5,196,963 A | * | 3/1993 | Sato et al. .................. 359/699 |
| 5,392,159 A | * | 2/1995 | Sasaki et al. ............... 359/691 |
| 5,495,309 A | * | 2/1996 | Shiina et al. .............. 354/195.12 |
| 5,510,937 A | * | 4/1996 | Mogamiya .................. 359/823 |
| 5,631,776 A | * | 5/1997 | Weigand et al. ............ 359/694 |
| 5,699,199 A | * | 12/1997 | Cho et al. .................... 359/698 |
| 5,748,394 A | * | 5/1998 | Shimazaki et al. ......... 359/823 |
| 5,801,888 A | * | 9/1998 | Machida et al. ............ 359/694 |
| 5,982,566 A | | 11/1999 | Nishimura et al. ......... 359/822 |
| 6,104,549 A | * | 8/2000 | Iwasaki ....................... 359/694 |
| 6,215,605 B1 | * | 4/2001 | Kuwana et al. ............. 359/824 |
| 6,246,834 B1 | * | 6/2001 | Onda .......................... 396/85 |

FOREIGN PATENT DOCUMENTS

| | | | |
|---|---|---|---|
| JP | 5-11310 | 1/1993 | ........... G02B/11/04 |
| JP | 2593203 | 12/1996 | ............ G02B/7/08 |

\* cited by examiner

*Primary Examiner*—Georgia Epps
*Assistant Examiner*—Saeed Seyrafi
(74) *Attorney, Agent, or Firm*—Leydig, Voit & Mayer, Ltd.

(57) ABSTRACT

A lens barrel includes first and second tubes, a base, a single motor, and a drive gear for transmitting a drive force of the motor to the first and second tubes. The drive gear includes a cylindrical gear and a shaft gear having a shaft inserted in the cylindrical gear. The cylindrical gear and the shaft gear rotate about a common rotation axis. The cylindrical gear is interposed between a first feed screw and the motor, and the shaft gear is interposed between a second feed screw and the motor. Accordingly, zooming and focusing can be made by one motor, increasing density and integration and providing excellent space efficiency.

3 Claims, 16 Drawing Sheets

WIDE-ANGLE-SIDE POSITION (X-X)

BARREL-SUNK POSITION (Z-Z)

BARREL-SUNK POSITION (W-W)

WIDE-ANGLE-SIDE POSITION (W-W)

BARREL-SUNK POSITION (X-X)

WIDE-ANGLE-SIDE POSITION (X-X)

TELEPHOTO-SIDE POSITION(Y-Y)

Fig. 14A  BARREL-SUNK POSITION (Z-Z)
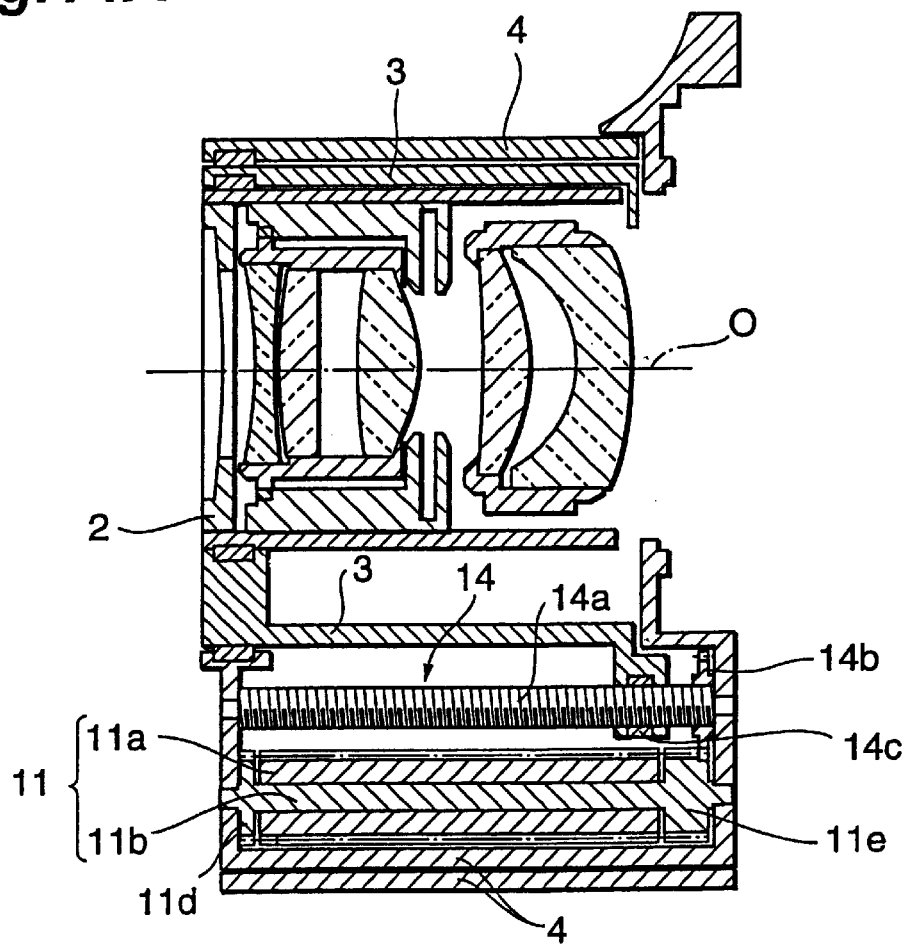
Fig. 14B  BARREL-SUNK POSITION (Z-Z)
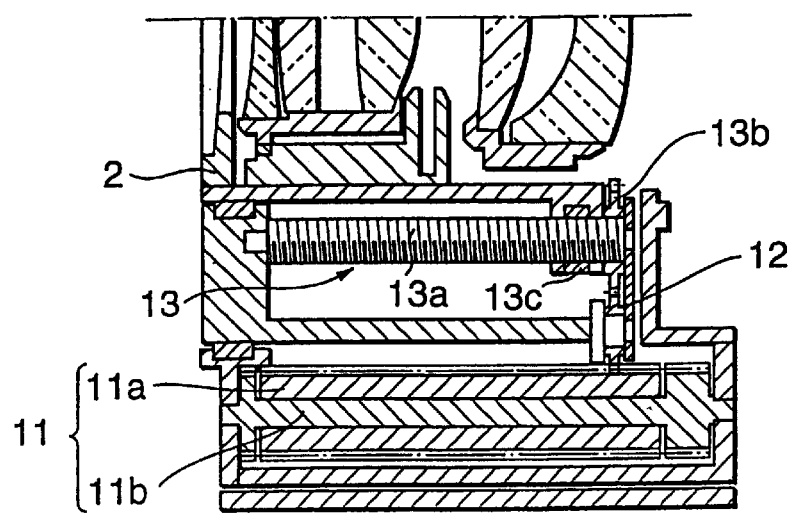

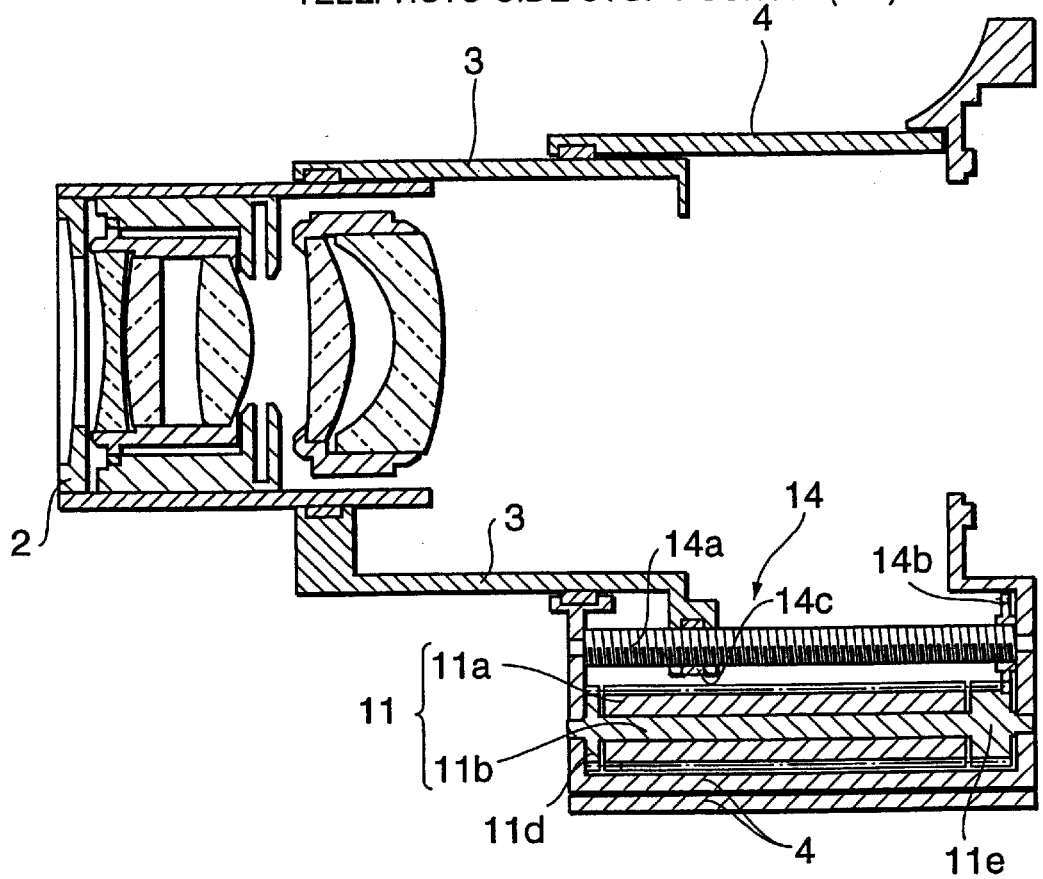
Fig.15A TELEPHOTO-SIDE STOP POSITION(Z-Z)
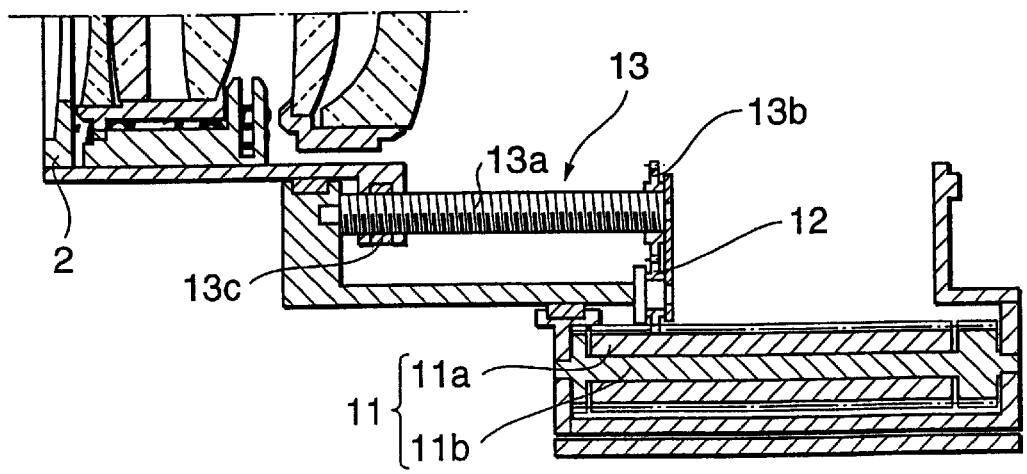
Fig.15B TELEPHOTO-SIDE STOP POSITION(Z-Z)

TELEPHOTO-SIDE FOCUSING STATE(Z-Z)

TELEPHOTO-SIDE FOCUSING STATE(Z-Z)

LENS BARREL

BACKGROUND OF THE INVENTION

1. Field of the Invention

The present invention relates to a lens barrel used in an optical system.

2. Related Background Art

In a small-sized camera having a multi-focal-point lens (zoom lens), the barrel is expanded and contracted to change the distance between an in-barrel lens (lens group) and a focal surface and hence the magnification (hereinafter, also referred to as zooming). At this time, the lenses in the barrel are divided at least into two groups to change the distance between the lens groups to a distance suited for each zoom ratio. Also, the action of image focusing (hereinafter, also referred to as focusing) is required for any magnification. Focusing is made by changing the position of the in-barrel lens relative to a focusing plane.

In order to expand and contract the barrel, the barrel has conventionally been made in a structure comprising a plurality of tube members. For example, there is as one example a technology described in Japanese Patent Laid-open No.H5-11310. The lens barrel described in this publication has first and second tubes sliding in an optical-axis direction of the optical system, and a base for accommodating therein the first and second tubes. The first tube is allowed to protrude from the interior of the second tube toward a subject side, and the second tube is allowed to protrude from the base toward the subject. Also, a single motor as a drive source is provided to slide both the first and second tubes. A first feed screw mechanism is provided in the second tube to slide the first tube due to a drive force of the motor. Furthermore, a second feed screw mechanism is also provided in the base to slide the second tube due to a drive force of the motor.

The expansion-and-contraction mechanism of the barrel described in the above publication is devised as in expanding and contracting the barrel by the single motor, realizing an increase of part density and integration and further achieving a low-cost due to reduction in part count. However, the increase in density and integration for parts is further advanced for the interior of optical apparatus and such tendency is conspicuous for the small-sized cameras. Under such situation, saving of space is desired for the barrel expansion-and-contraction mechanism. Therefore, the object of the invention is to provide a lens barrel having an expansion-and-contraction mechanism high in space efficiency.

SUMMARY OF THE INVENTION

Furthermore, the above publication describes a plurality of lens groups wherein movement control for the lens groups is performed in a general manner, i.e., the distance between the lens groups is changed during focusing or changing the zoom-ratio. However, another motor is arranged in addition to the motor for barrel expansion and contraction, in order to change the distance between the lens groups. The arrangement of two motors nearby the lens is an impediment to density and integration increase and forms a factor requiring a corresponding cost. The second object of the invention is to provide a lens barrel, which has a single motor to perform both barrel expansion/contraction and distance change between the lens groups thus realizing an increase of density and integration as well as cost reduction.

SUMMARY OF THE INVENTION

According to the present invention, a lens barrel comprises: first and second tubes slidable in an optical direction of an optical system, a base for accommodating the first and second tubes therein, a single motor as a drive source to slide both the first and second tubes, a first feed screw being provided in the second tube to slide the first tube due to a drive force of the motor, a second feed screw being provided in the base to slide the second tube due to a drive force of the motor, and a drive gear to transmit a drive force of the motor to the first and second tubes. The drive gear comprises a cylindrical gear and a shaft gear having a shaft inserted in said cylindrical gear The cylindrical gear and the shaft gear rotate about a common rotation axis. The first tube is allowed to protrude from an interior of the second tube toward a subject, and the second tube is allowed to protrude from an interior of said base toward the subject. The cylindrical gear is interposed between the first feed screw and the motor, and the shaft gear is interposed between the second feed screw and the motor.

Preferably, a pair of first and second gears are included. They rotate about a common rotation axis. The first gear is interposed between the shaft gear and the motor, and the second gear is interposed between the cylindrical gear and the motor. Any one of the first gear and the second gear has an elongate hole formed in a circumferential direction and the other has a protrusion protruding into the elongate hole.

More preferably, a first lens group and a second lens group are included. The second lens group is movable relative to the first lens group within the first tube by a cam mechanism and protruding movement of the first tube from the second tube. The cam mechanism is made between the first tube and the second tube.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 14A is a development view of a section on the line Z—Z(A-SIDE) (barrel-sunk position);

FIG. 14B is a development view of a section on the line Z—Z(B-SIDE) (barrel-sunk position);

FIG. 15A is a development view of a section on the line Z—Z(A-SIDE) (telephoto-side stop position);

FIG. 15B is a development view of a section on the line Z—Z(B-SIDE) (telephoto-side stop position)

DESCRIPTION OF THE PREFERRED EMBODIMENT

An embodiment of a lens barrel of the present invention will be explained below with reference to the drawings. The lens barrel of the present embodiment is a barrel for a small-sized camera. First, explained is a structure outline of the lens barrel 1 of the present embodiment.

Figure 1A:
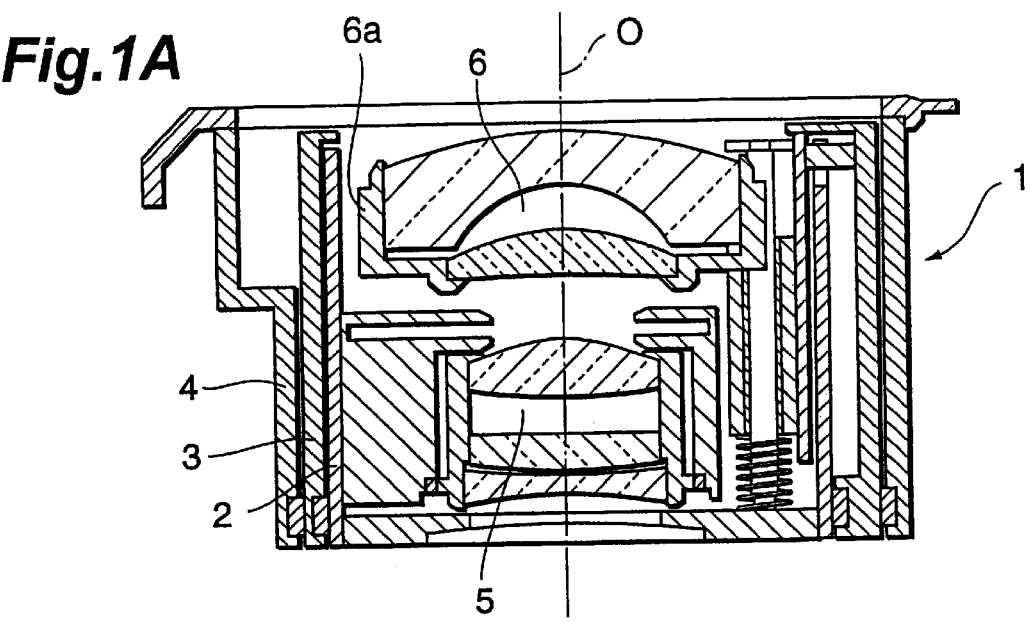
FIG. 1A is a sectional view on a plane parallel to an optical axis.
Figure 1B:
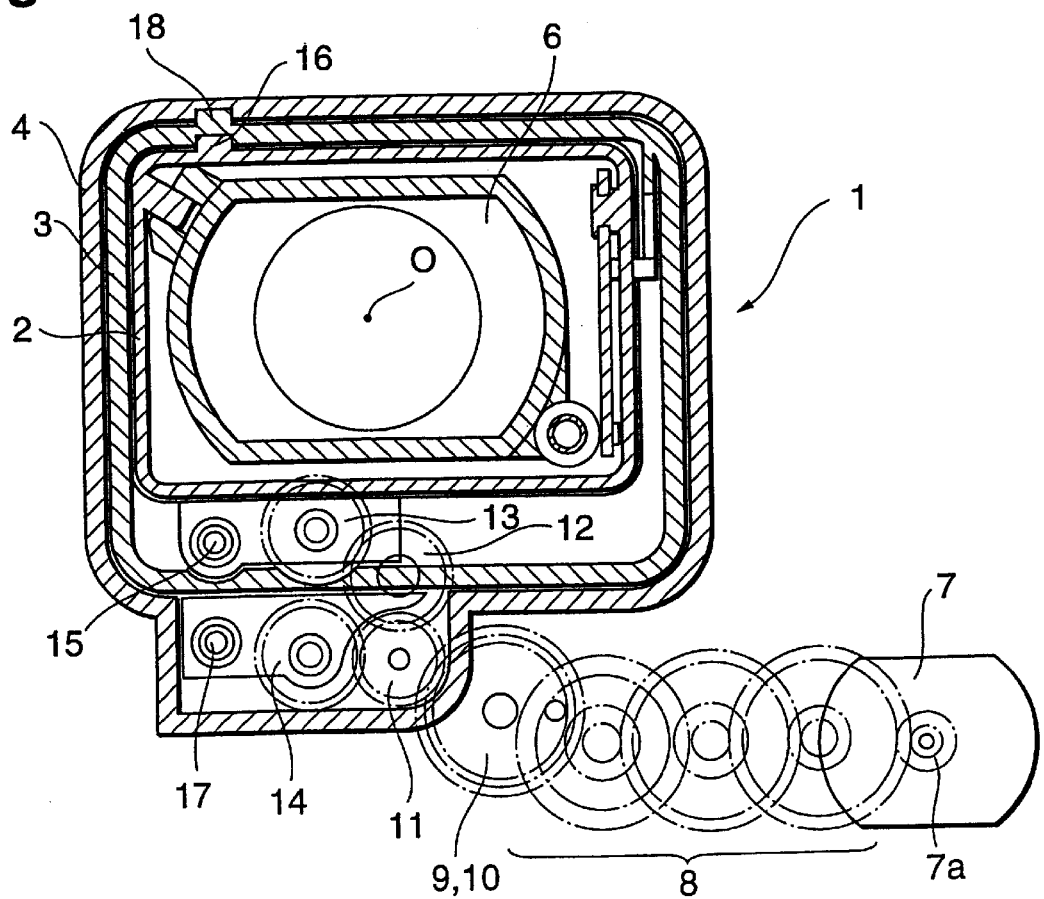
FIG. 1B is a sectional view on a plane perpendicular to an optical axis.

FIG. 1A shows a sectional view on a plane parallel with an optical axis O of the lens barrel 1 (hereinafter, also referred merely as barrel 1). On the other hand, FIG. 1B shows a sectional view on a plane perpendicular to the optical axis O of the barrel 1. Incidentally, the state that the barrel 1 is most shortened in expansion/contraction state (hereinafter, this state is referred also as a barrel-sunk state) is shown in FIG. 1A and FIG. 1B.

The barrel 1 is mainly structured by a first tube 2, a second tube 3 and a base (fixed tube) 4. The first tube 2, the second tube 3 and the base 4 of the present embodiment have a rectangular section as shown in FIG. 1B. In the barrel-sunk state, the first tube 2 is accommodated in an interior space of the second tube 3 and the second tube 3 is accommodated in an interior space of the base 4. The base 4 is made integral with the camera main body (not shown).

The first tube 2 slides in a direction of the optical axis O relative to both the second tube 3 and the base 4. Also, the second tube 3 slides in the direction of the optical axis O relative to the base 4. That is, the first tube 2 is allowed to protrude from an inside of the second tube 3 toward a subject side [to the below in FIG. 1A, toward this in FIG. 1B], and the second tube 3 is allowed to protrude from an inside of the base 4 toward the subject side.

Furthermore, a first lens group 5 and a second lens group 6 are arranged inside the first tube 2. During zooming, the distance between these first lens group 5 and second lens group 6 is adjusted in accordance with a zooming ratio. The first lens group 5 is fixed at the subject side of the first tube 2. Also, the second lens group 6, although mounted inside the first tube 2, is allowed to move in the direction of the optical axis O within the first tube 2. A cam mechanism is made between the first tube 2 and the second tube 3. The movement of the second lens group 6 relative to the first lens group 5 is made using the cam mechanism and the protruding action of the first tube 2 from the second tube 3. This will be explained later.

In the vicinity of the first tube 2, second tube 3 and base 4, a motor 7 is arranged as a drive source to slide the first tube 2 and second tube 3. A gear 7a is attached on an output shaft of the motor 7. This gear 7a transmits a drive force to a drive gear 11 through reduction gears 8, a first gear 9 and a second gear 10. The first gear 9, second gear 10 and drive gear 11 will be explained in detail later. On the drive gear 11, the transmission path of drive force from the motor 7 is divided to deliver one part to a first feed screw mechanism 13 through an intermediate gear 12 and the other part to a second feed screw mechanism 14.

A first feed screw mechanism 13 is a mechanism to slide the first tube 2, which is arranged within the second tube 3. A second feed screw mechanism 14 is a mechanism to slide the second tube 3, which is arranged within the base 4. The first feed screw mechanism 13 and the second feed screw mechanism 14 are arranged parallel with the optical axis O. The first feed screw mechanism 13 and second feed screw mechanism 14 will be explained in detail later.

In the vicinity of the first feed screw mechanism 13 in the second tube 3, a first guide shaft 15 is arranged parallel with the first feed screw mechanism 13. The first guide shaft 15 is inserted in a sleeve in part of the first tube 2 to guide the first tube to slide relative to the second tube 3. Also, besides the first feed screw mechanism 13 and the first guide shaft 15, a first guide mechanism 16 is also formed in order to guide the first tube 2 to slide relative to the second tube 3. The first guide mechanism 16 comprises a groove portion formed parallel with the optical axis O in the inner surface of the second tube 3 and a convex portion formed in an outer surface of the first tube 2.

Also, in the vicinity of the second feed screw mechanism 14 in the base 4, a second guide shaft 17 is arranged parallel with the second feed screw mechanism 14. The second guide shaft 17 is inserted in a sleeve in part of the second tube 3 to guide the second tube 3 to slide relative to the base 4. Also, besides the second feed screw mechanism 14 and the second guide shaft 17, a second guide mechanism 18 is also formed in order to guide the second tube 3 to slide relative to the base 4. The second guide mechanism 18 comprises a groove portion formed parallel with the optical axis O in the inner surface of the base 4 and a convex portion formed in an outer surface of the second tube 3.

Next, the behavior of the first lens group 5 and second lens group 6 during zooming will be explained with reference to FIG. 2 to FIG. 5 and FIG. 6 to FIG. 9.

Figure 2:
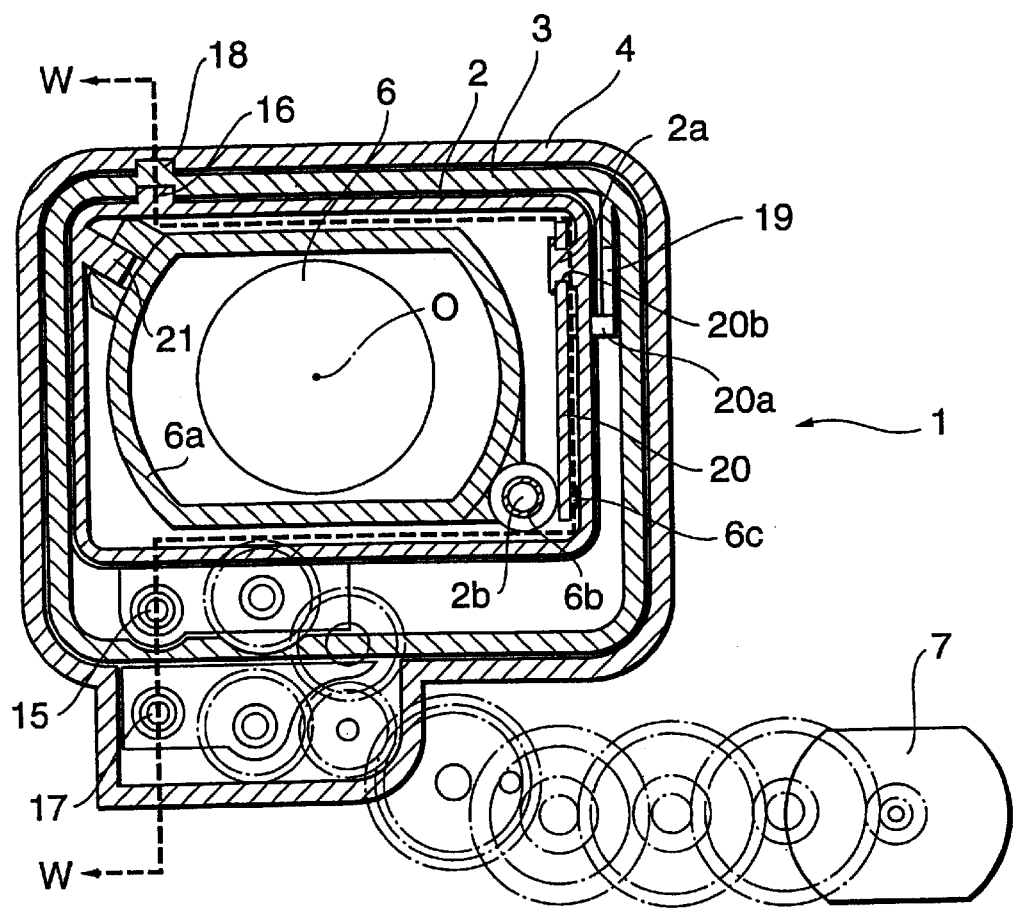
FIG. 2 is a sectional view showing a line W—W.
Figure 4:
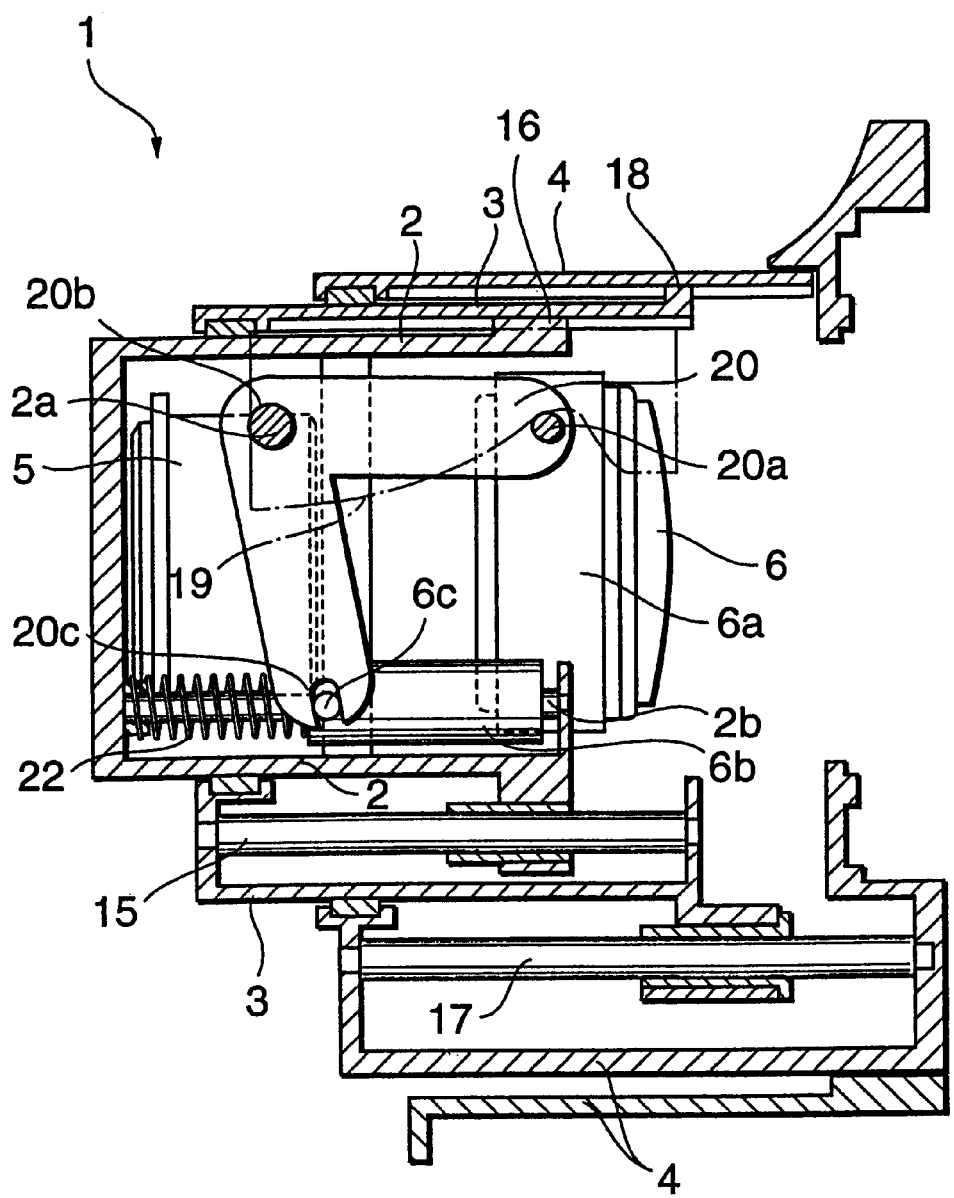
Figure 5:
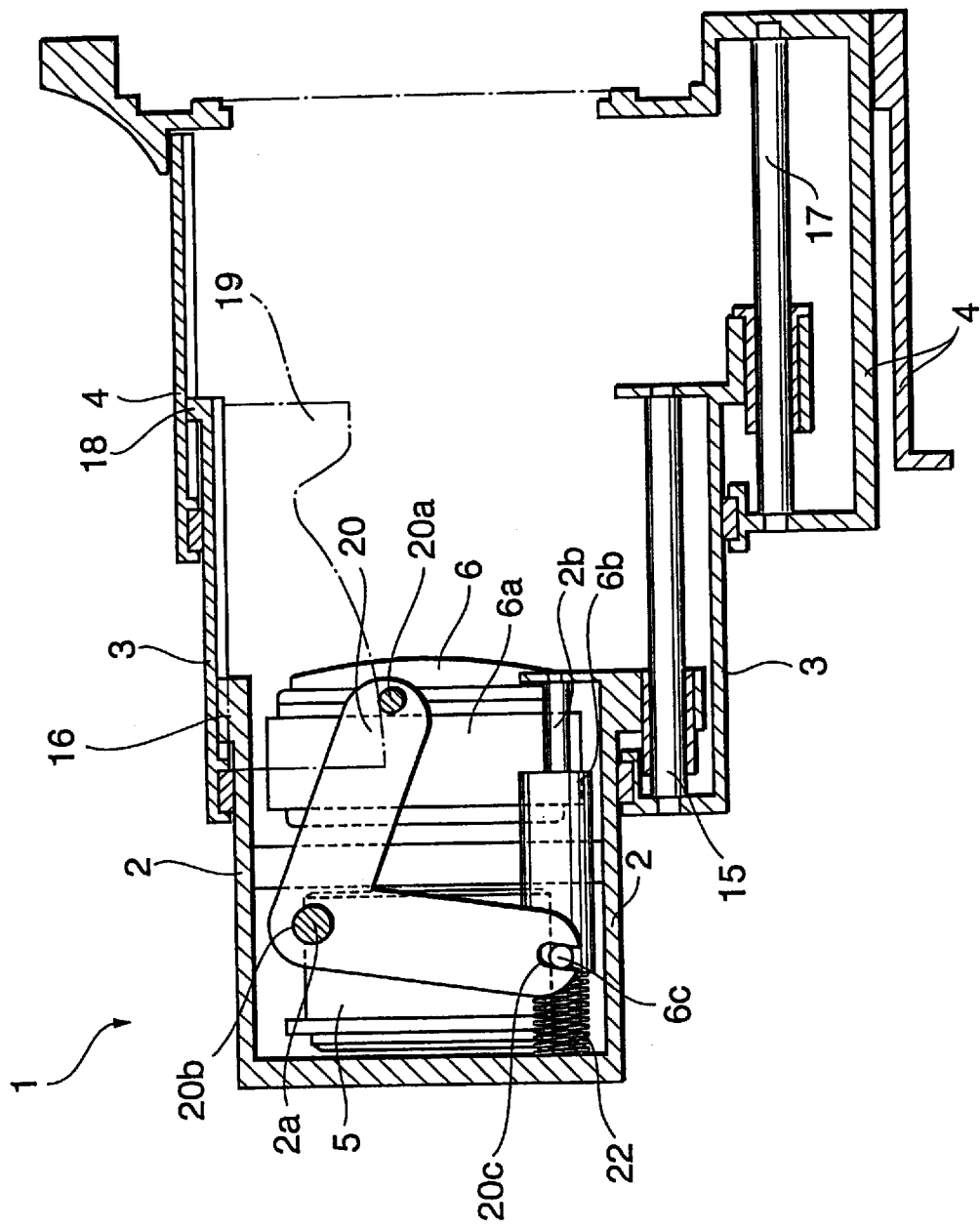
FIG. 5 is a development view of a section on the line W—W (telephoto-side position)
Figure 6:
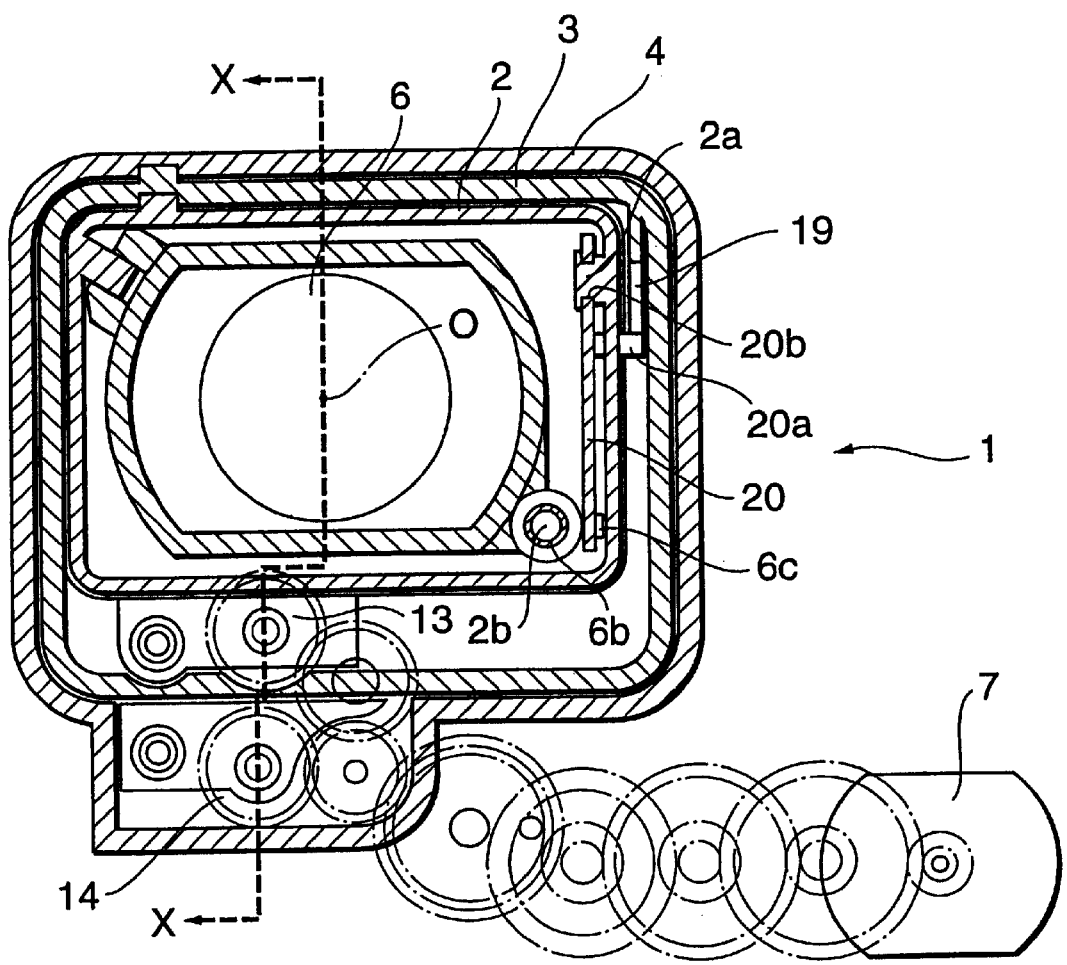
FIG. 6 is a sectional view showing a line X—X.

Although FIG. 3 to FIG. 5 and FIG. 7 to FIG. 9 are all sectional views, the section taken is different between FIG. 3 to FIG. 5 and FIG. 7 to FIG. 9. FIG. 2 shows a section line of FIG. 3 to FIG. 5, while FIG. 6 shows a section line of FIG. 7 to FIG. 9.

Figure 3:
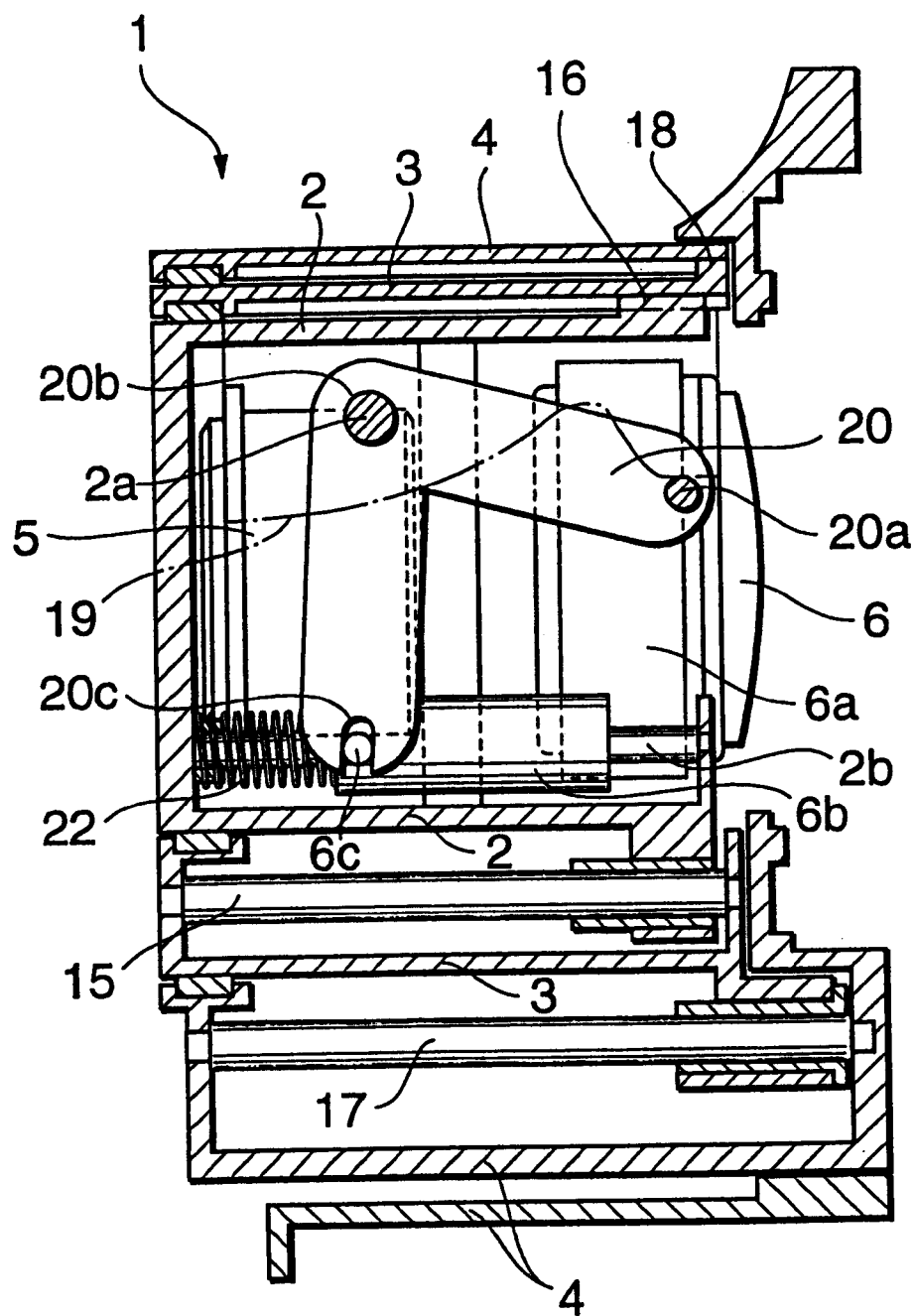
FIG. 3 is a development view of a section on the line W—W (barrel-sunk position)
Figure 7:
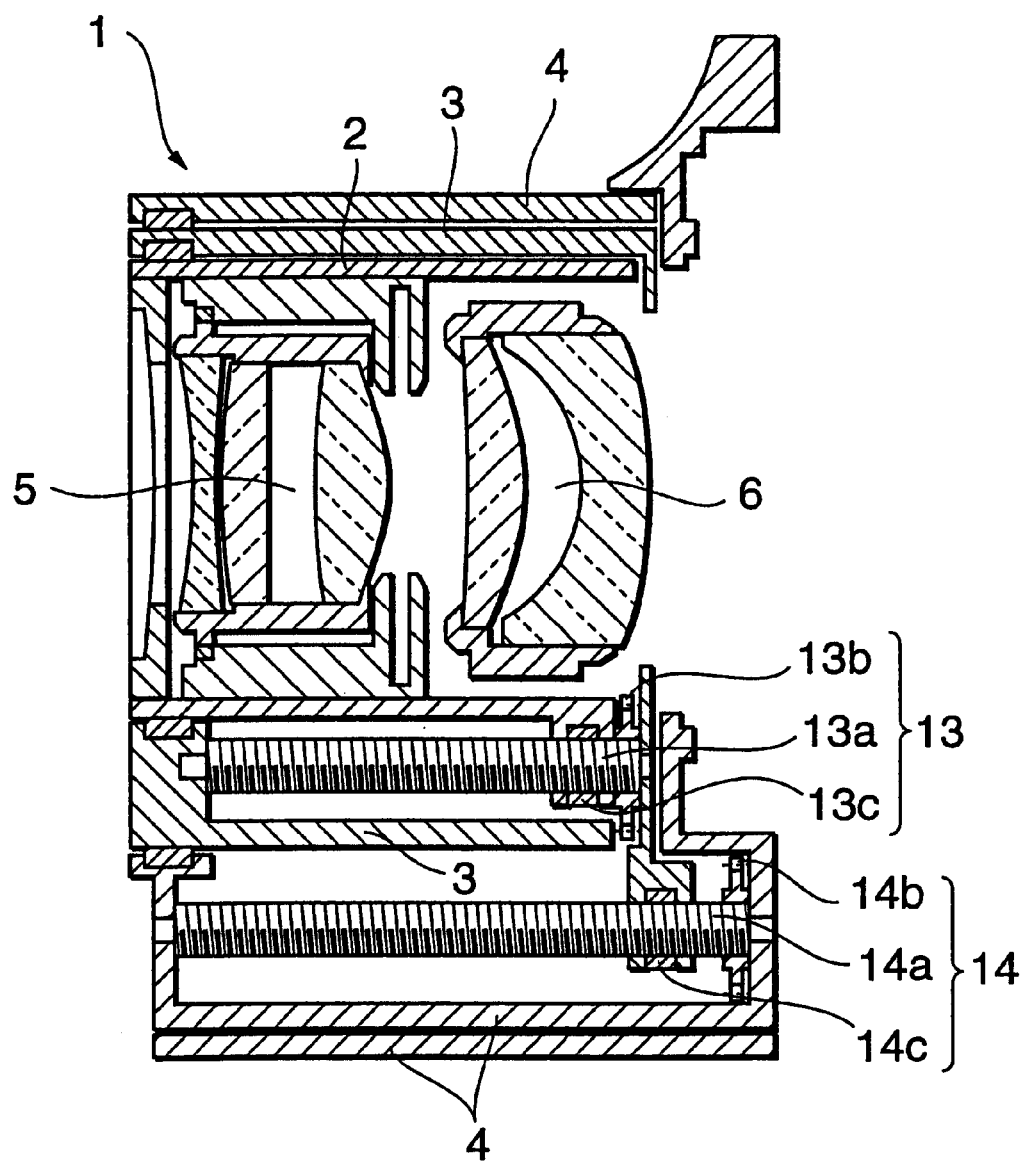
FIG. 7 is a development view of a section on the line X—X (barrel-sunk position)
Figure 8:
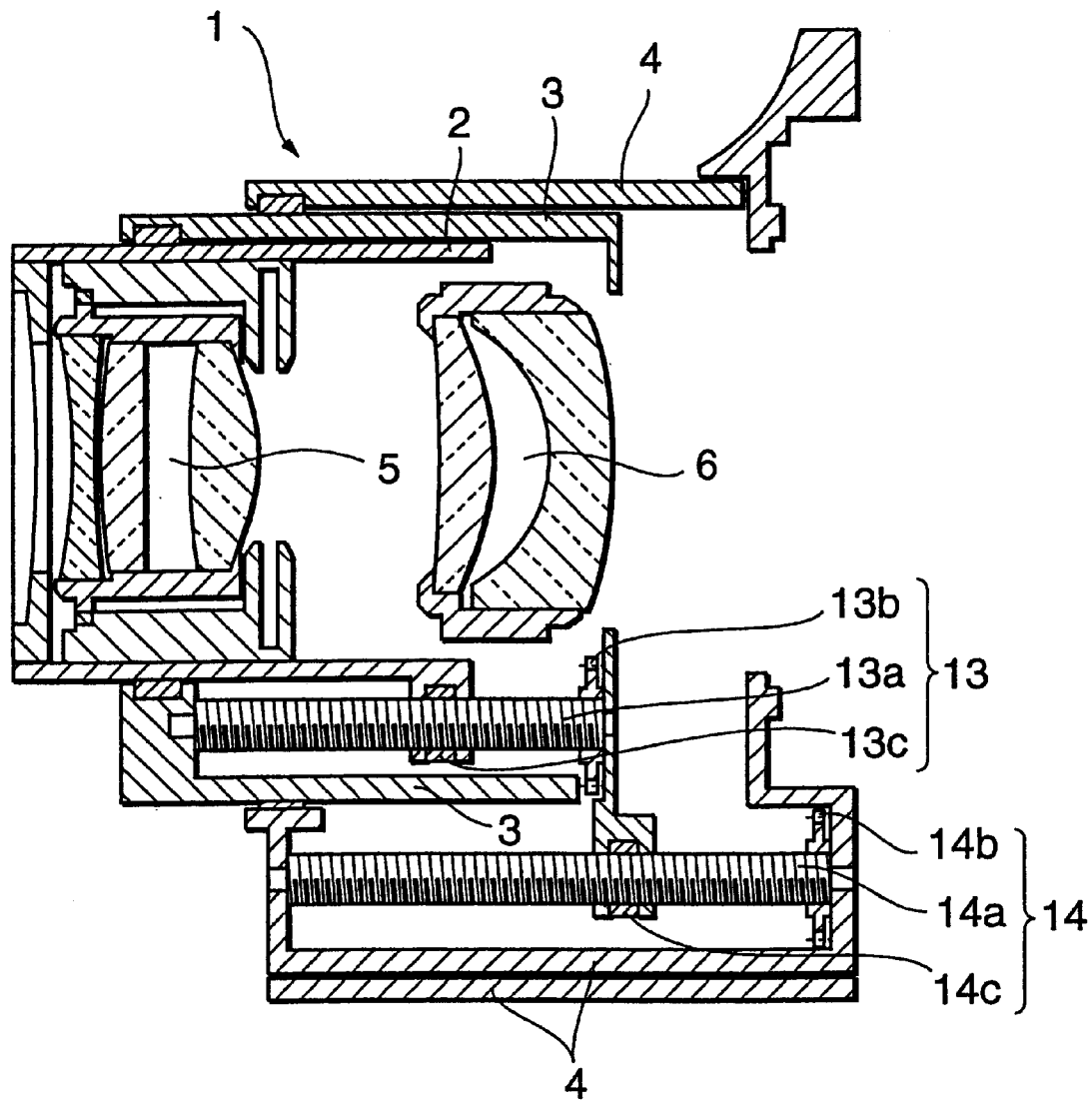
FIG. 8 is a development view of a section on the line X—X in (wide-angle-side position)
Figure 9:
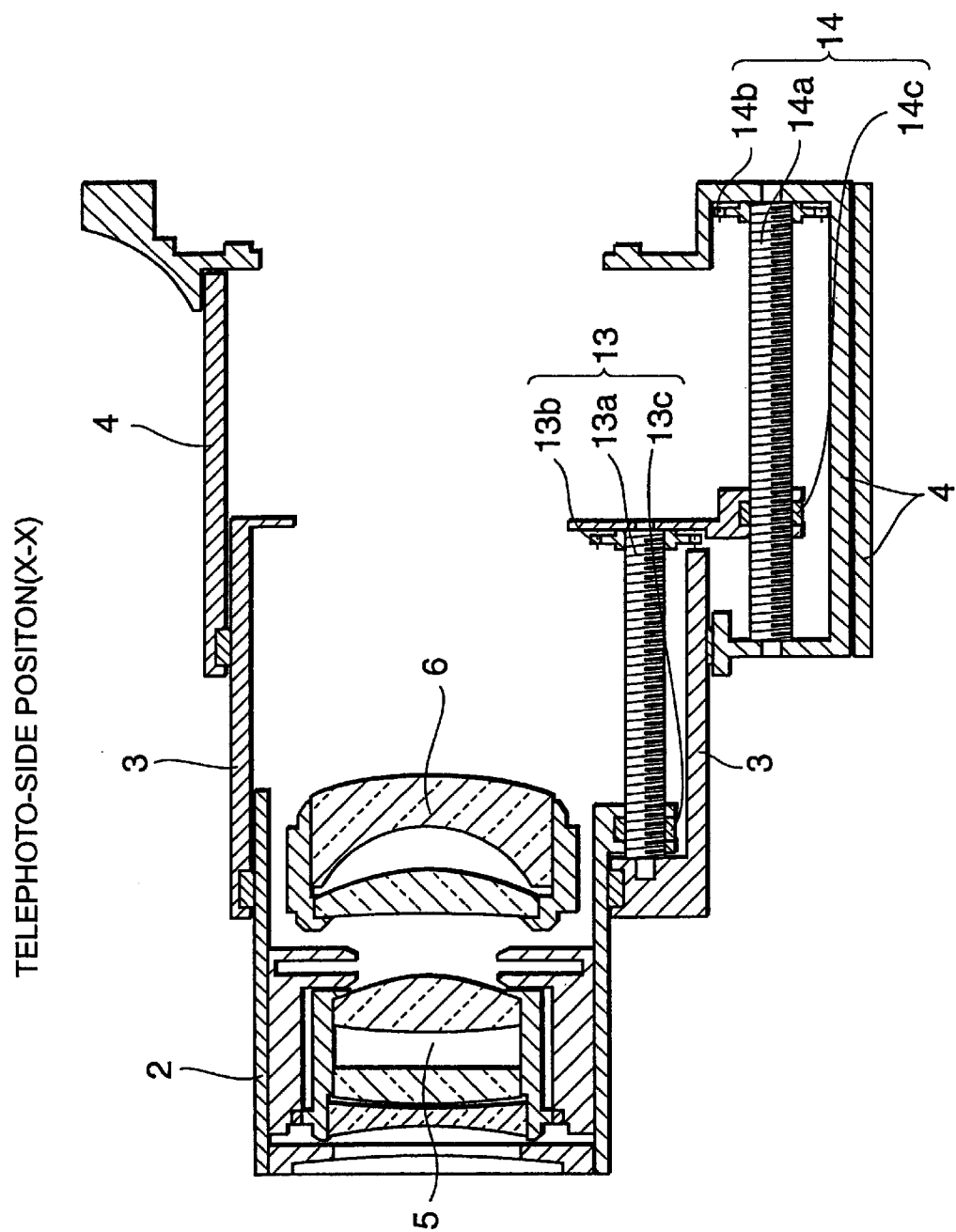
FIG. 9 is a development view of a section on the line X—X in (telephoto-side position)

FIG. 3 and FIG. 7 show a case that the barrel 1 is in a barrel-sunk state. FIG. 4 and FIG. 8 show a case that the barrel 1 (including the first lens group 5 and the second lens group 6) is in a wide-angle state. This position of the barrel 1 is referred also to a wide-angle-side position. FIG. 5 and FIG. 9 show a case that the barrel 1 (including the first lens group 5 and the second lens group 6) is in a telephoto state. This position of the barrel 1 is referred also to a telephoto-side position.

The distance between the first lens group 5 and the second lens group 6 is long when in a wide-angle position but short when on a telephoto side. When the barrel is sunk, the distance between the first lens group 5 and the second lens group 6 is shortened similarly to that on the telephoto side, in order to make compact the camera. The distance between the first lens group 5 and the second lens group 6 is changed using the cam mechanism and the protruding action of the first tube 2 from the second tube 3, as described above. The cam mechanism is made between the first tube 2 and the second tube 3. The structure of the cam mechanism will be explained below.

The cam mechanism comprises, as shown in FIG. 2 and FIG. 3, a cam plate 19 provided standing at the inner surface of the second tube 3 and a link member 20 having a pin 20a to abut against a cam profile formed on the cam plate 19. The cam plate 19, at its flat surface, is placed parallel with the optical axis O. The link member 20 is an L-formed plate member having, at its end surface, the pin 20a protruding from the interior of the first tube 2 toward the second tube 3. Also, the link member 20, at its center bend portion, is formed with a mount hole 20b for rotatably mounting on a boss 2a protruding in the inner surface of the first tube 2. Furthermore, the link member 20 at the other end is formed with a slit 20c with which a hereinafter-referred pin 6c is to be hooked.

The second lens group 6 is mounted in a lens holder 6a. This lens holder 6a has a cylindrical sleeve 6b in its lower side portion. In the sleeve 6b is inserted a guide shaft 2b attached in the first tube 2. The guide shaft 2b is arranged parallel with the optical axis O. The second lens group 6 is guided to slide in the first tube 2 by the guide shaft 2b and sleeve 6b. Besides the guide shaft 2b and the sleeve 6b, in order to guide the second lens group 6 to slide in the first tube 2, a third guide mechanism 21 is also formed (see FIG. 2). The third guide mechanism 21 comprises a convex portion formed on the inner surface of the first tube 2 and a groove portion formed parallel with the optical axis O in the outer surface of the lens holder 6a.

A pin 6c parallel with the pin 20a projects from a side surface of the sleeve 6b and engages the slit 20c of the link member 20. The pin 6c is movable in the slit 20c. The guide shaft 2b at the subject side (left side in FIG. 3) is inserted with a coiled spring 22. The coil spring 22 at an subject-side end abuts against the inner surface of the first tube 2 and, at the other end, abuts against an end surface of the sleeve 6b. Consequently, the second lens group 6 is always urged by a coiled spring 22 in a direction away from the first lens group 5 so that the pin 20a of the link member 20 is always in a state urged on a cam follower of the cam plate 19.

The cam follower for the cam plate 19 at its center portion is shaved toward the above in FIG. 3. In the barrel-sunk state shown in FIG. 3 the second lens group 6 is positioned close to the first lens group 5 by the link member 20. Because the pin 20a is contacted to the cam plate 19 at its portion closer to a film surface (right side in FIG. 3) than the cut portion.

From this state, when the first tube 2 is slid toward the subject with respect to the second tube 3, the pin 20a moves following the cam follower of the cam plate 19 and goes into abutment against the center portion of the cam plate 19. This position is a wide-angle-side position shown in FIG. 4 and FIG. 8. At this time, the pin 20a has moved in position toward the above in FIG. 4. Simultaneously, "within the first tube 2", the pin 6c moves toward the film surface due to the cam mechanism. As a result, the distance between the first lens group 5 and the second lens group 6 is lengthened.

From this state, when the first tube 2 is further slid toward the subject with respect to the second tube 3, the pin 20a moves following the cam follower of the cam plate 19 and goes into abutment against the subject-side portion of the cam plate 19. This position is a telephoto-side position shown in FIG. 5 and FIG. 9. At this time, the pin 20a has moved in position downward in FIG. 5. Simultaneously, "within the first tube 2", the pin 6c moves toward the subject due to the cam mechanism. As a result, the distance between the first lens group 5 and the second lens group 6 is shortened.

In this manner, the distance between the first lens group 5 and the second lens group 6 is changed by the extension/contraction action of the first tube 2 relative to the second tube 3 and the above cam mechanism. This realizes, for each zoom ratio, an optimal distance between the first lens group 5 and the second lens group 6, making possible to optimize the focusing state on a film surface. If doing so, there is no necessity of providing a motor or the like in order to change the distance between the first lens group 5 and the second lens group 6. Thus, this can be realized by the extension/contraction action of the first tube 2 on the second tube 3 and the above cam mechanism.

Incidentally, the behavior of the first lens group 5 and second lens group 6 in "focusing" after "zooming" will be explained in detail later. Also, when the first tube 2 is slid toward the subject with respect to the second tube 3, the second tube 3 is also slid toward the subject with respect to the base 4. Next, this behavior will be explained.

Next, the behavior of the first tube 2 and second tube 3 during zooming will be explained.

Figure 10:
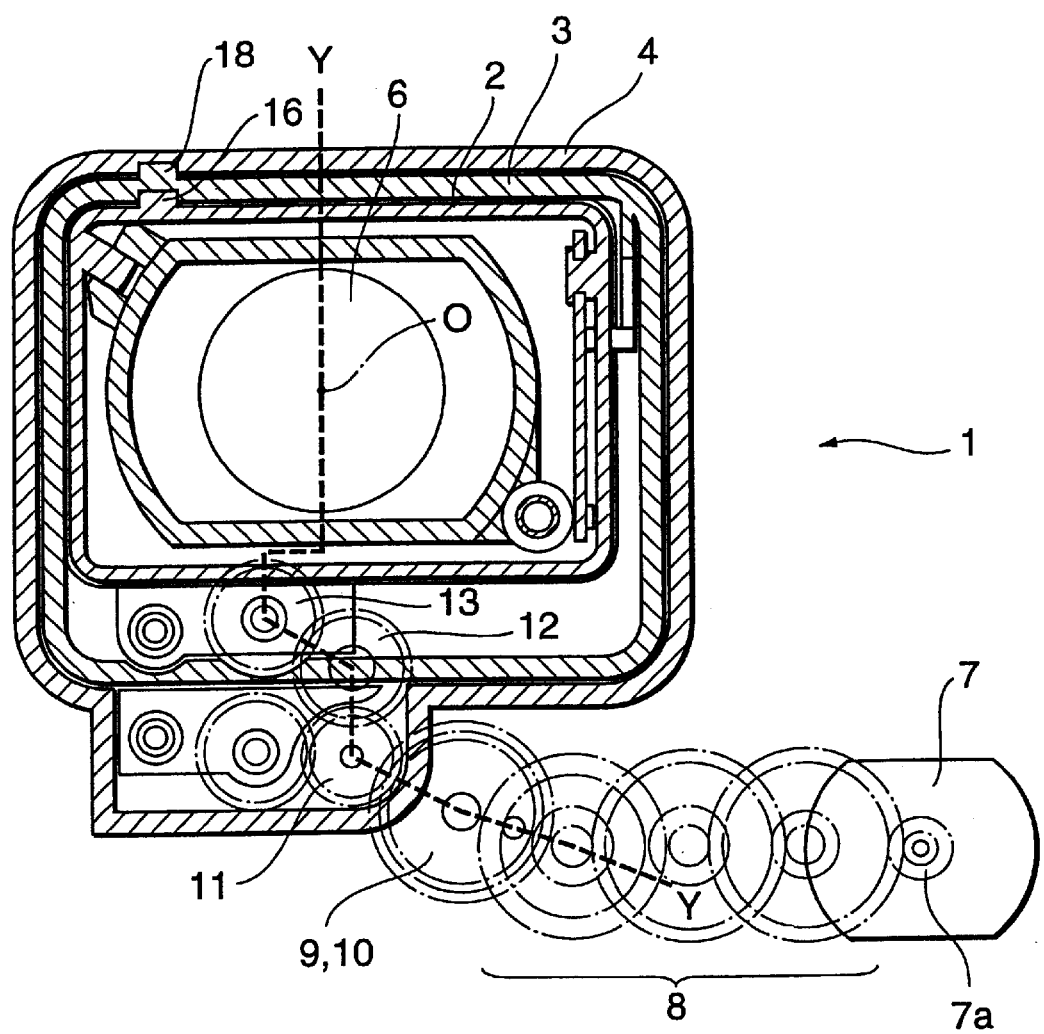
FIG. 10 is a sectional view showing a line Y—Y.
Figure 11:
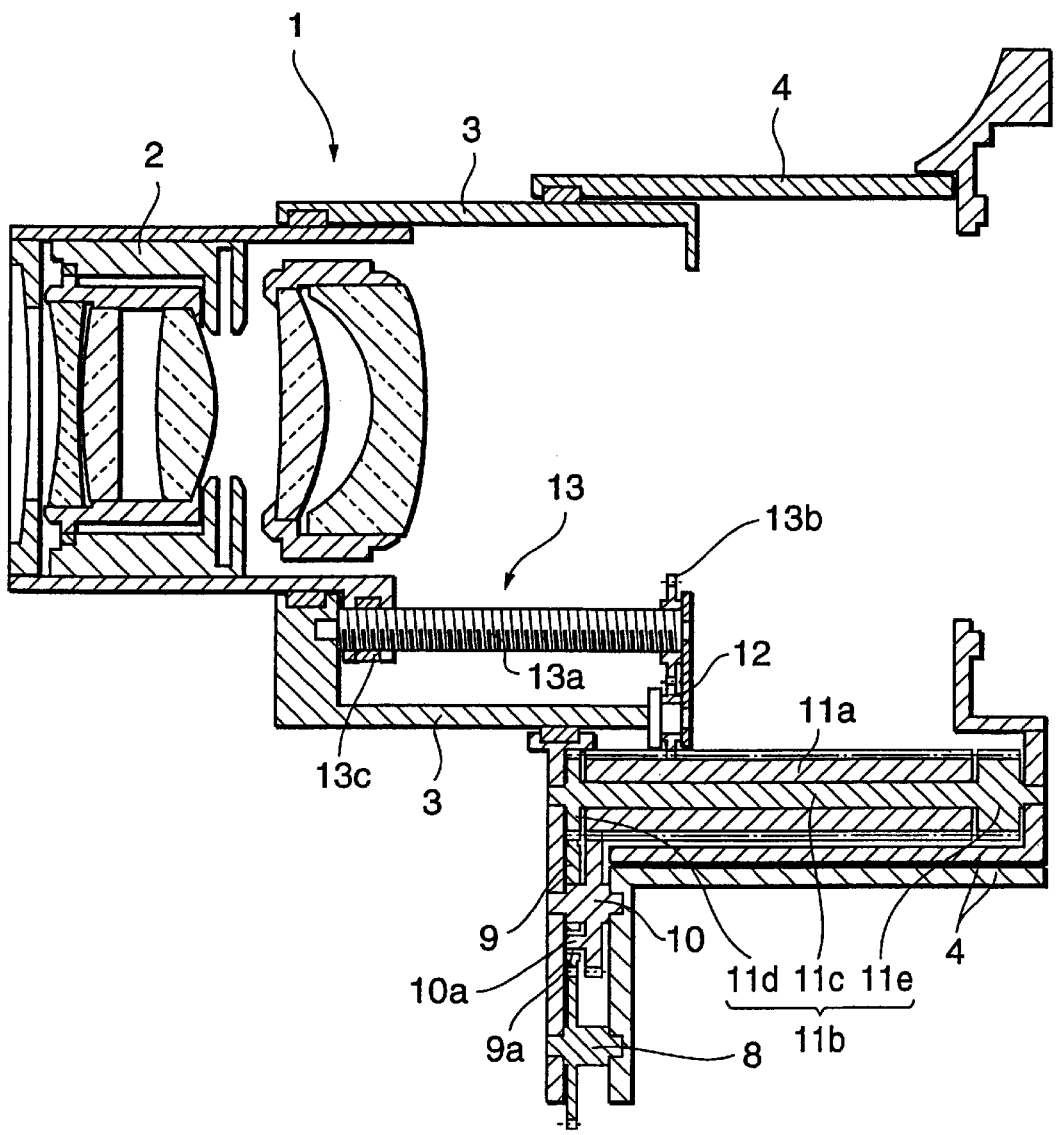
FIG. 11 is a development view of a section on the line Y—Y.

First, explanation is made on a structure for transmitting a drive force from the motor 7 through the drive gear 11 to the first feed screw mechanism 13, using FIGS. 10 to FIG. 12. FIG. 11 is a sectional development view shown by developing the lower portion of a section cut by line Y—Y shown in FIG. 10. The line Y—Y passes through the optical axis O of the optical system, a center of the first feed screw mechanism 13, the intermediate gear 12, the drive gear 11, the first gear 9 and the second gear 10.

As shown in FIG. 10 and FIG. 11, the drive force of the motor 7 is transmitted to the first gear 9 by the reduction gears 8. The first gear 9 rotates about a same rotary shaft as a second gear 10. The first gear 9 and the second gear 10 are shown in FIG. 12. The first gear 9 shown in FIG. 12A although formed with gear teeth in a disk outer periphery thereof, has an elongate hole 9a circumferentially formed in the disk portion. The elongate hole 9a is not provided in the entire peripheral range of the first gear 9 but in part thereof. Also, the first gear 9 is also formed, at its center, with an insertion hole 9b in which a shaft 10b of the second gear 10 is rotatably inserted.

Figure 12A:
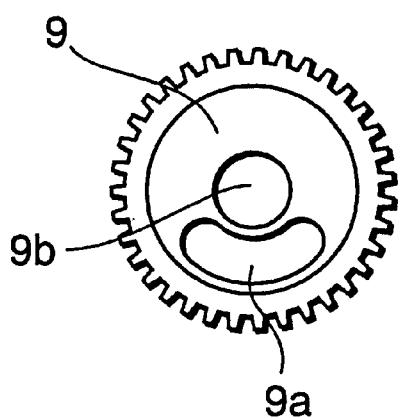
FIG. 12A is a front view of a first gear.
Figure 12B:
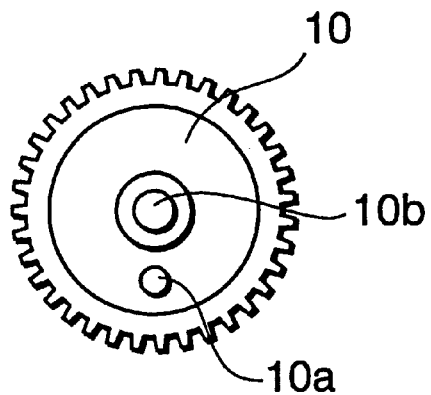
FIG. 12B is a front view of a second gear.

On the other hand, the second gear 10 shown in FIG. 12B is formed with gear teeth in an outer periphery of its disk similarly to the first gear 9. A protrusion 10a is provided protruding from the disk portion. Also, the second gear 10 is formed, at its center, with a shaft 10b to be rotatably inserted in the insertion hole 9b of the first gear 9. The protrusion 10a protrudes in the elongate hole 9a of the first gear 9, as shown in FIG. 11. The first gear 9 and the second gear 10 are the same in gear-teeth count and gear radius.

Figure 12C:
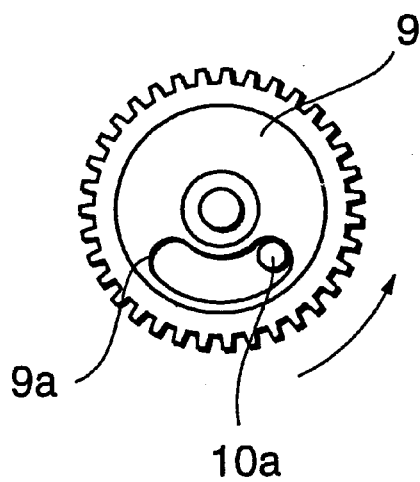
FIG. 12C is a view of a state stacking the first and second gears.
Figure 12D:
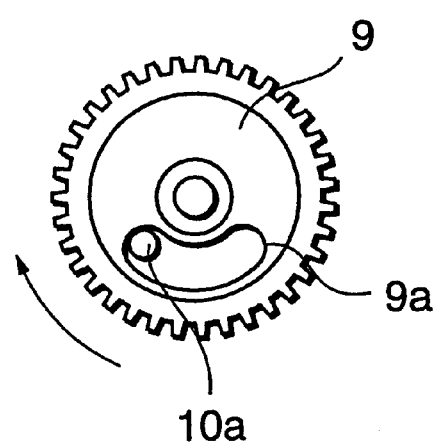
FIG. 12D is also a view of a state stacking the first and second gears.

As described above, the drive force from the motor 7 is transmitted to the first gear 9 through the reduction gears 8. When the first gear 9 is rotated by the drive force, the elongate hole 9a rotates to abut any of opposite ends against the protrusion 10a of the second gear 10. This state is shown in FIG. 12C or FIG. 12D. When the first gear 9 is rotated furthermore in a direction of the arrow in FIG. 12C or FIG. 12D by the reduction gears 8, because the protrusion 10a and the end of the elongate hole 9a are in abutment against, the first gear 9 and the second gear 10 rotate together. When the motor 7 enters into reverse rotation at any time point, only the first gear 9 is rotated before the protrusion 10a comes into abutment against an opposite end of the elongate hole 9a.

By the first gear 9 and the second gear 10 structured as above, the drive gear 11 for driving the first feed screw mechanism 13 and the second feed screw mechanism 14 is rotated. Hereunder, the mechanism of the first feed screw mechanism 13 and second feed screw mechanism 14 is first explained and thereafter the structure of the drive gear 11 is explained.

The first feed screw mechanism 13 is arranged mainly at an inside of the second tube 3, as shown in FIG. 11. The first feed screw mechanism 13 comprises a first feed screw 13a arranged parallel with the optical axis O, a gear 13b fixed at one end of the first feed screw 13a and a nut 13c rotatably fitted on the first feed screw 13a. The gear 13b rotates on the same rotary axis as the first feed screw 13a. The nut 13c is held by the first tube 2 with restriction of its rotation. The first feed screw 13a is formed with a screw groove on its surface. By rotating the first feed screw 13a, the nut 13c is moved in left/right directions in FIG. 11. Due to this, the first tube 2 slides relative to the second tube 3.

The second feed screw mechanism 14 also has a similar structure to the first feed screw mechanism 13, as shown in FIG. 7 to FIG. 9. However, the second feed screw mechanism 14 is mainly arranged inside the base 4, and comprises a second feed screw 14a arranged parallel with the optical axis O, a gear 14b fixed at one end of the second feed screw 14a and a nut 14c rotatably fitted on the second feed screw 14a. The nut 14c in a state restricted in rotation is held by the second tube 3. By rotating the second feed screw 14a, the nut 14c is moved in left-and-right directions in FIG. 7 to FIG. 9. This slides the second tube 3 relative to the base 4.

As shown in FIG. 11, the drive gear 11 for transmitting a drive force to the first feed screw mechanism 13 and the second feed screw mechanism 14, is of a double structure comprising a cylindrical gear 11a and a shaft gear 11b. The shaft gear 11b has a shaft 11c inserted in the cylindrical gear 11a. The cylindrical gear 11a and the shaft gear 11b rotate independently of each other about the common rotation axis.

The cylindrical gear 11a is formed with a plurality of linear grooves parallel with the rotation axis on its outer peripheral surface. This linear grooves are in mesh with an intermediate gear 12 attached to the second tube 3. The intermediate gear 12 is in mesh with a gear 13b of the first feed screw mechanism 13. Also, the cylindrical gear 11a is also in mesh with the second gear 10 stated above. The cylindrical gear 11a receives a drive force of the motor 7 from the second gear 10 and transmits it to the first feed screw mechanism 13 through the intermediate gear 12. Incidentally, the intermediate gear 12 is allowed to change the position of mesh with the cylindrical gear 11a by a slide of the second tube 3.

On the other hand, the shaft gear 11b has a shaft 11c not forming gear teeth on its center. The shaft 11c is inserted in the cylindrical gear 11a. And the shaft 11c is formed, at both ends, with gears 11d, 11e. The gears 11d, 11e are the same in gear-teeth count and gear radius as the cylindrical gear 11a. The gear 11d on the subject side is in mesh with the first gear 9 stated above. Also, the gear 11e on the film-surface side is in mesh with the gear 14b of the second feed screw mechanism 14 [this is not shown in FIG. 11, see FIG. 14A, FIG. 15A and FIG. 16A]. The shaft gear 11b receives, at the gear 11d, a drive force of the motor 7 from the first gear 9 and transmits it to the second feed screw mechanism 14 by the gear 11e.

Figure 13:
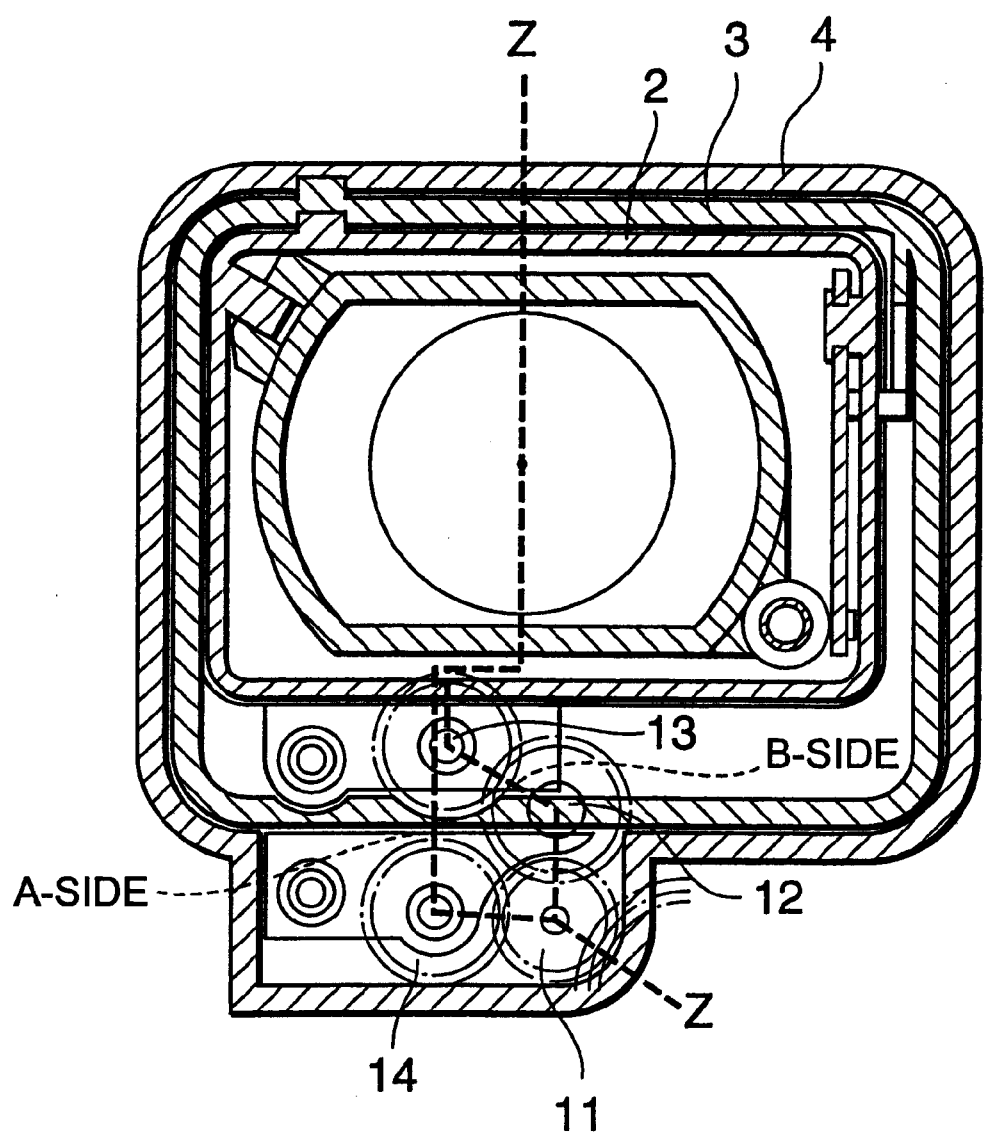
FIG. 13 is a sectional view showing lines Z—Z(A-SIDE) and Z—Z(B-SIDE)

The zooming operation and focusing operation using the first gear 9, the second gear 10, the drive gear 11, the first feed screw mechanism 13 and the second feed screw mechanism 14 will be explained with reference to FIG. 13. and FIGS. 14A,B to FIGS. 16A,B.

Figure 16A:
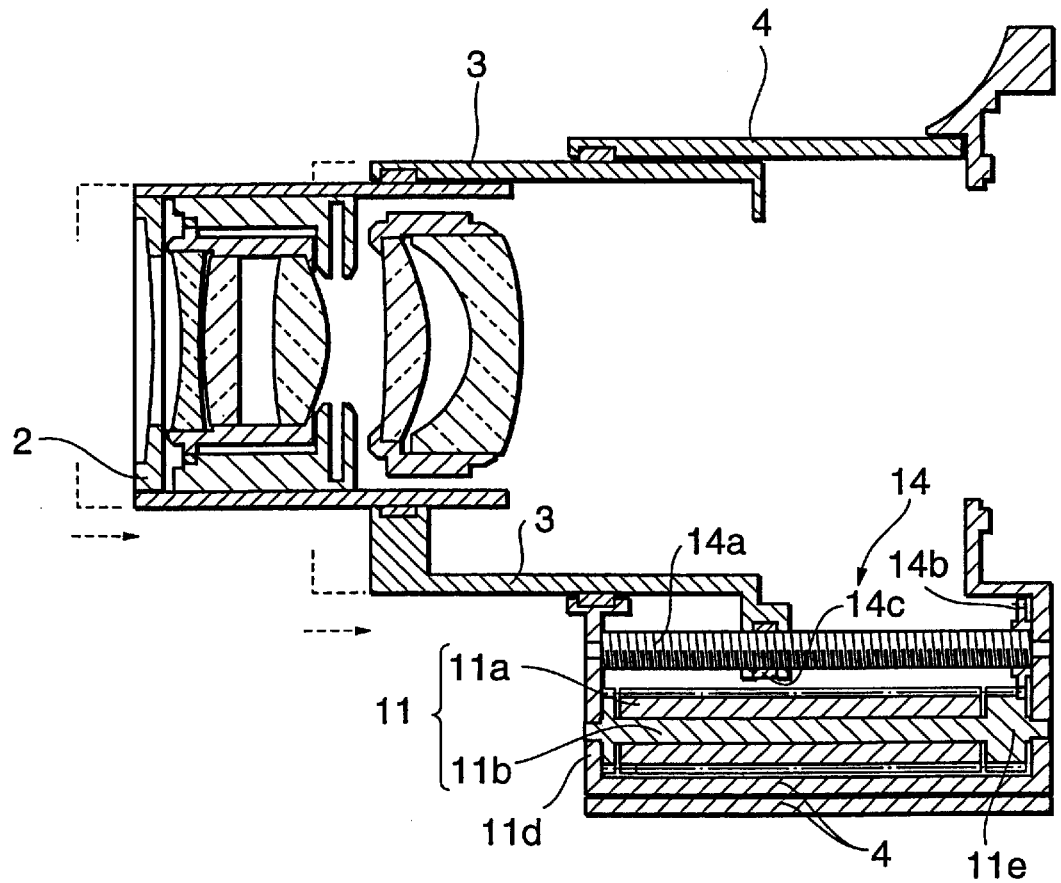
FIG. 16A is a development view of a section on the line Z—Z(A-SIDE) (telephoto-side focusing state)
Figure 16B:
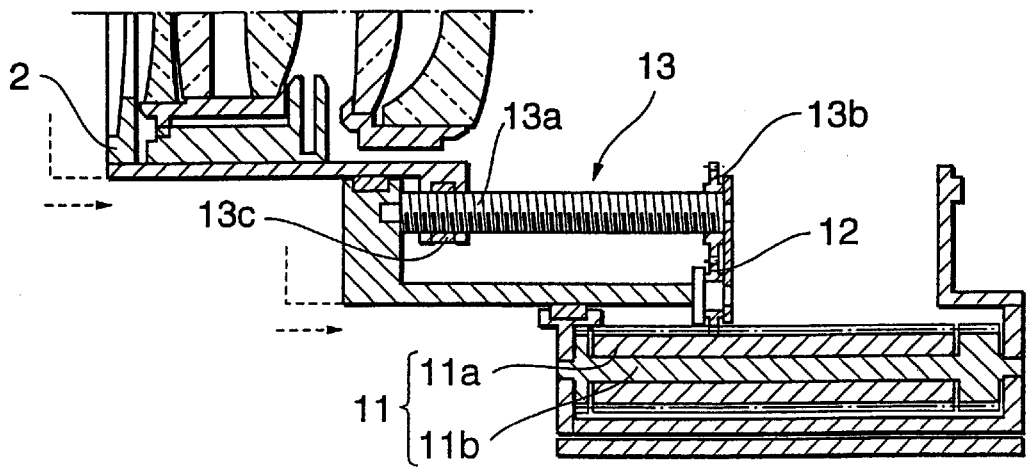
FIG. 16B is a development view of a section on the line Z—Z(B-SIDE) (telephoto-side focusing state).

Incidentally, FIG. 14A,B to FIG. 16A,B are section development views. Each FIG. 14A., FIG. 15A. and FIG. 16A is the sectional development view taken on the line Z—Z(A-Side) in FIG. 13. Also, each FIG. 14B., FIG. 15B. and FIG. 16B is the sectional development view taken on the line Z—Z(B-side) in FIG. 13. Each FIG. 14B., FIG. 15B. and FIG. 16B shows only a lower portion because the upper portion is same as each FIG. 14A., FIG. 15A. and FIG. 16A. That is, each FIG. 14A., FIG. 15A. and FIG. 16A. shows the mechanism for transmitting a drive force from the motor 7 to the second feed screw machine 14. Each FIG. 14B., FIG. 15B. and FIG. 16B shows the mechanism for transmitting a drive force from the motor 7 to the first feed screw machine 13. Also, Each FIGS. 14A,B shows a state that the barrel 1 is in a barrel-sunk position. Each FIGS. 15A,B shows a state that the barrel 1 is in a telephoto-side "stop" position due to zooming. The telephoto-side stop position is the initial position in the telephoto position. Each FIG. 16A,B shows a telephoto-side "focusing" state. The telephoto-side focusing state is the state after focusing from the telephoto-side stop position shown in FIGS. 15A,B.

Although FIGS. 14A,B to FIGS. 16A,B do not show a first gear 9 and a second gear 10, the cylindrical gear 11a and the shaft gear 11b of the drive gear 11 are respectively driven by the second gear 10 and the first gear 9 [see FIG. 11]. When the motor 7 is driven to extend the barrel 1 from the state shown in FIGS. 14A,B, the first gear 9 and the second gear 10 abut against at the elongate hole 9a and the protrusion 10a and rotate together about the common rotation axis, thereby rotating the cylindrical gear 11a and the shaft gear 11b of the drive gear 11. As a result, as shown in FIG. 14A the shaft gear 11b rotates the second feed screw 14a through the gear 14b of the second feed screw mechanism 14, and the second tube 3 is slid toward the subject relative to the base 4 by the movement of nut 14c. The state that the second tube 3 is slid extremely toward the subject is shown in FIG. 15A.

Simultaneous with this, as shown in FIG. 14B the cylindrical gear 11a rotates the gear 13b of the first feed screw mechanism 13 through the intermediate gear 12. By the rotation of the gear 13b, the first feed screw 13a is rotated. By the movement of the nut 13c, the first tube 2 is slid toward the subject relative to the second tube 3. At this time, the drive gear 11 is fixed to the base 4 and the first feed screw mechanism 13 moves together with the second tube 3 toward the subject. Due to this, the intermediate gear 12 meshes, while sliding, with the cylindrical gear 11a, thereby transmitting a drive force of the motor 7 to the first feed screw mechanism 13. The state that the first tube 2 is slid extremely toward the subject is shown in FIG. 15B. Furthermore, utilizing the slide of the first tube 2 relative to the second tube 3, as stated above the distance between the first lens group 5 and the second lens group 6 is changed in accordance with a zooming ratio.

The state shown in FIGS. 15A,B is an initial position of the barrel 1 in a telephoto-side position. In this state, the zooming has been ended, followed by focusing to adjust the focus of the subject image on the film surface. Focusing is made by moving the first lens group 5 and second lens group 6 together in the optical axis O direction without changing the distance between them. This is made by reverse rotating the motor 7 from the position shown in FIGS. 15A,B. That is, the initial position in each zoom ratio is set in a state that focusing is on the subject side of the film-surface position. Focusing is performed from this position.

When the motor 7 is reverse rotated for focusing, the shaft gear 11b only is rotated without rotating the cylindrical gear 11a before the second gear 10 at its protrusion 10a comes into contact with the other end of the elongate hole 9a of the first gear 9. Due to this, before the second gear 10 at its protrusion 10a contacts the other end of the elongate hole 9a of the first gear 9, as shown in FIGS. 16A,B the second feed screw mechanism 14 only is driven to slide the first tube 2 and second tube 3 toward the film-surface side without changing the position between them thus performing focusing. Because the cylindrical gear 11a is not rotated, the first feed screw mechanism 13 is out of function resulting in no slide of the first tube 2 relative to the second tube 3. Thus, the barrel 1 is expanded or contracted to perform zooming and focusing.

The rectangular-sectioned barrel cannot adopt helicoid mechanism for rotating and expanding-and-contracting the barrel because of its rectangular section. However, as in the present embodiment, by architecting a compact expansion/contraction mechanism using two stages of feed screws, the barrel can be expanded or contracted without any troubles despite the barrel is rectangular in section. Although circular-sectioned barrel is difficult in arranging parts around it (useless space tends to occur), the rectangular-sectioned barrel has a phase of easy to arrange parts around it and excellent in space efficiency. The barrel of the present embodiment applicable to such a rectangular-sectioned barrel not only contributes, in barrel itself, to density and integration increase of optical apparatus but also has a phase to facilitate density and integration increase for peripheral parts thereof.

The lens barrel of the present invention is not limited to the above embodiment. For example, with the lens barrel of the above embodiment, although the optical system was made by the two lens groups, i.e., the first lens group 5 and the second lens group 6, the optical system may be made by three or more of lens groups. Also, any of the lens groups, i.e. the first lens group 5 and the second lens group 6, was made by a plurality of lenses, there can be a case that one lens group be made by only one lens. Furthermore, where a plurality of lenses are provided, a structure can be contemplated that all of them are not arranged at the interior of the first tube 2.

Also, with the above embodiment, the first gear 9 for driving the second feed screw mechanism 14 had the elongate hole 9a and the second gear 10 for driving the first feed screw mechanism 13 had the protrusion 10a. However, conversely, the gear for driving the second feed screw mechanism 14 may have a pin, and the gear for driving the first feed screw mechanism 13 have an elongate hole. Furthermore, in the present embodiment, although the first gear 9 and second gear 10 rotate the drive gear 11 directly, other gears may be interposed between them. However, the structure for directly driving the drive gear 11 by the first gear 9 and second gear 10 is superior in space efficiency and hence preferred. Similarly, the structure for directly driving the first feed screw mechanism 13 and the second feed screw mechanism 14 by the drive gear 11, or the structure for driving them through only the minimum gear such as the intermediate gear 12 is superior in space efficiency and hence preferred.

In the present invention, the drive gear comprises a cylindrical gear and a shaft gear having a shaft inserted in the cylindrical gear. And the cylindrical gear and the shaft gear rotate about a common rotation axis. And more, the cylindrical gear is interposed between the first feed screw mechanism and the motor. The shaft gear is interposed between the second feed screw mechanism and the motor. Accordingly, because the mechanism for transmitting a motor drive force to the first tube and second tube can be made compact, space efficiency is excellent. Also, because the first tube and the second tube can be slid by the single motor through the drive gear, space efficiency is excellent also from this viewpoint. Furthermore, one motor is satisfactorily required resulting in excellence in cost.

A pair of first and second gears are preferably included which rotates about a common axis. The first gear is interposed between the shaft gear and the motor. And the second gear is interposed between the cylindrical gear and the motor. Any one of the first gear and the second gear has an elongate hole formed in a circumferential direction, and the other has a protrusion protruding into the elongate hole. Accordingly, zooming and focusing can be made by one motor, it increases density and integration and provides Excellent space efficiency. Also, this makes only one motor as a drive source not only for zooming but also for focusing.

The second lens group is movable relative to the first lens group within the first tube. And the second lens group is moved relative to the first lens group by a cam mechanism and protruding movement of the first tube from the second tube. The cam mechanism is made between the first tube and the second tube. Accordingly, there is no need to provide a drive source, such as a separate motor for adjusting the distance between the both lens groups suited for a zoom ratio. This provides excellence in terms of cost, reduces the number of parts, and achieving high-integration (excellent space efficiency).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lens barrel comprising:

first and second tubes slidable in an optical axis direction of an optical system;

a base for accommodating said first and second tubes therein;

a single motor as a drive source for sliding both said first and second tubes;

a first feed screw located in said second tube for sliding said first tube in response to a drive force of said motor;

a second feed screw located in said base for sliding said second tube in response to a drive force of said motor; and a drive gear for transmitting a drive force of said motor to said first and second tubes, wherein said first tube may protrude from an interior of said second tube toward a subject, and said second tube may protrude from an interior of said base toward the subject;

said drive gear comprises a cylindrical gear and a shaft gear having a shaft inserted in said cylindrical gear, said cylindrical gear and said shaft gear rotating about a common rotation axis; and said cylindrical gear is interposed between said first feed screw and said motor, said shaft gear being interposed between said second feed screw and said motor.

2. The lens barrel according to claim 1, comprising a pair of first and second gears rotating about a common rotation axis, said first gear being interposed between said shaft gear and said motor, said second gear being interposed between said cylindrical gear and said motor, and one of said first gear and said second gear having an elongate hole in a circumferential direction, the other of said first gear and said second gear having a protrusion protruding into the elongate hole.

3. The lens barrel according to claim 2, having:

a first lens group;

a second lens group movable relative to said first lens group within said first tube; and a cam mechanism coupling said first tube, said second tube, and one of said first and second lens group, and moving said second lens group relative to said first lens group in response to movement of said first tube relative to said second tube.

* * * * *